Nov. 30, 1948.  B. D. IRVIN  2,455,307

TRACTION DEVICE FOR WHEELED VEHICLES

Filed Sept. 11, 1945  4 Sheets-Sheet 1

Inventor
Basil D. Irvin
BY
Attys.

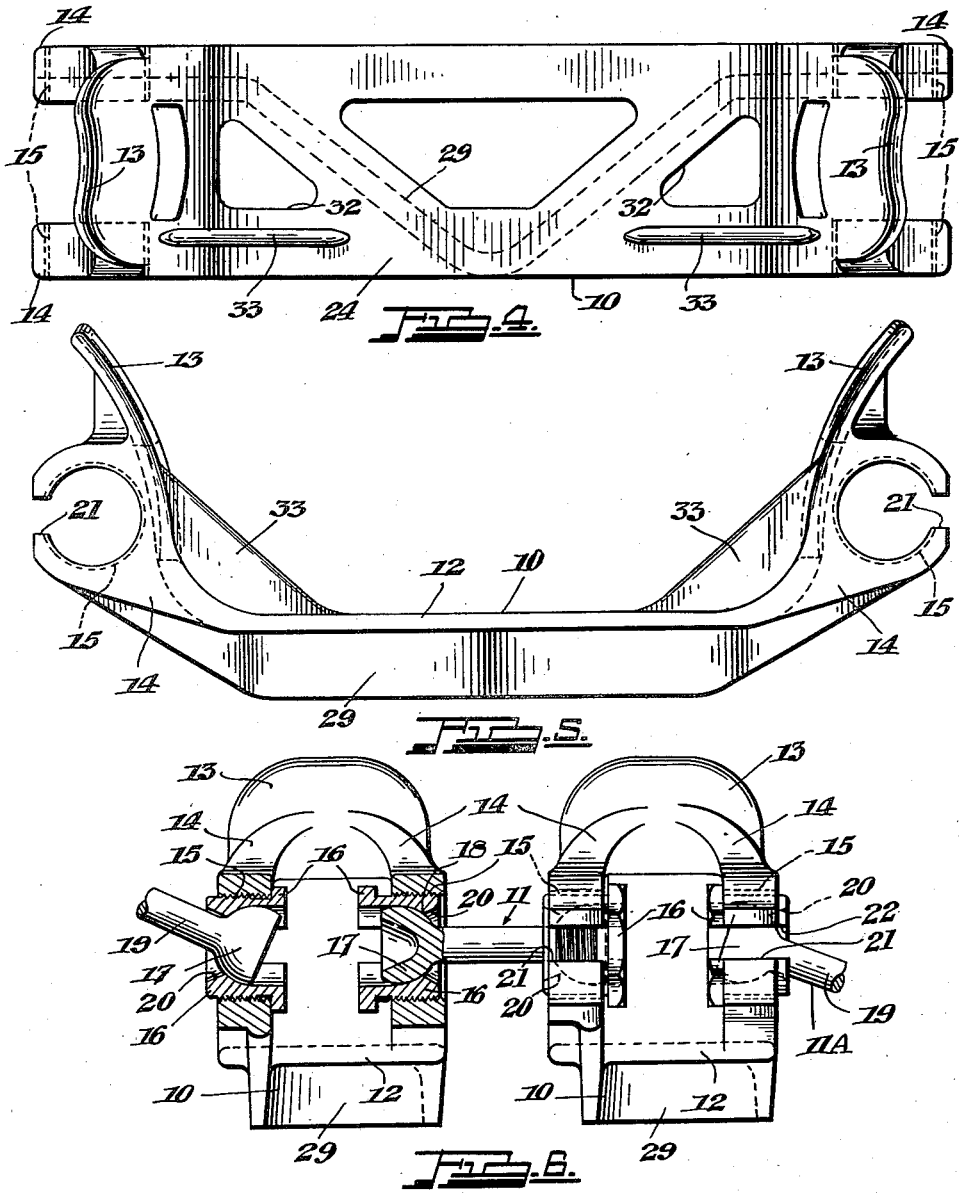

Nov. 30, 1948.　　　　B. D. IRVIN　　　　2,455,307
TRACTION DEVICE FOR WHEELED VEHICLES
Filed Sept. 11, 1945　　　　4 Sheets-Sheet 3
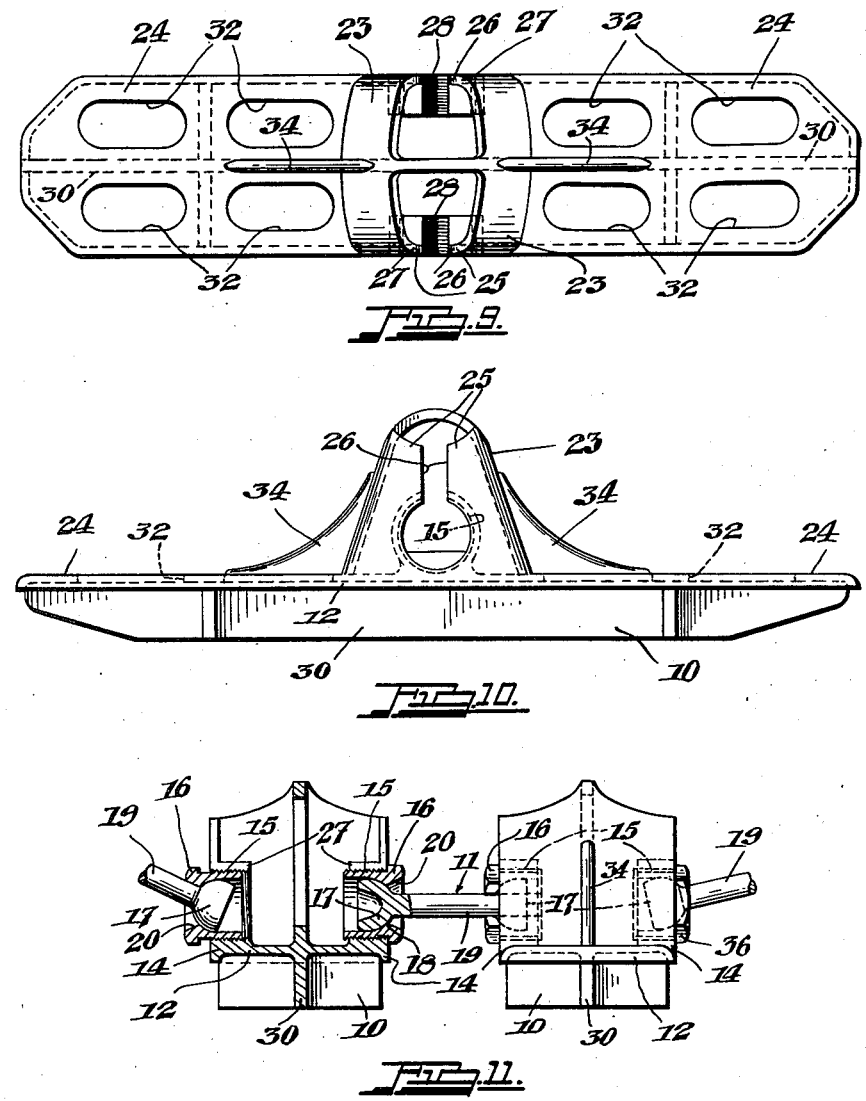
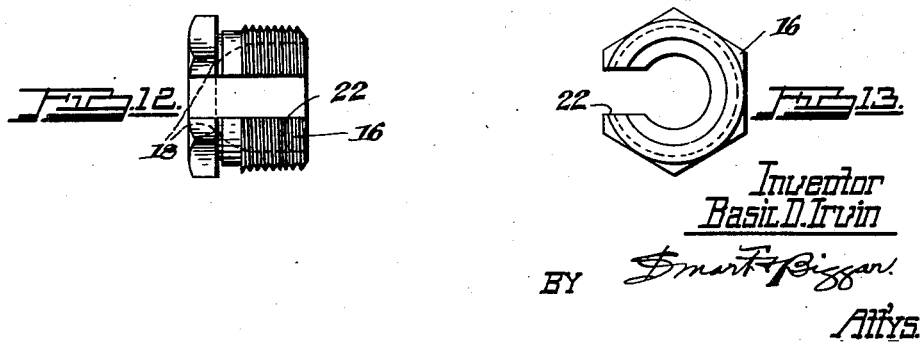
Inventor
Basil D. Irvin
BY
Attys.

Nov. 30, 1948. B. D. IRVIN 2,455,307
TRACTION DEVICE FOR WHEELED VEHICLES
Filed Sept. 11, 1945 4 Sheets-Sheet 4

Inventor
Basil D. Irvin
By Smart & Biggar
Attys.

Patented Nov. 30, 1948

2,455,307

UNITED STATES PATENT OFFICE 2,455,307

TRACTION DEVICE FOR WHEELED VEHICLES

Basil Dion Irvin, Ottawa, Ontario, Canada, assignor of one-half to Norman Samuel, Toronto, Ontario, Canada Application September 11, 1945, Serial No. 615,519
In Canada August 2, 1945

13 Claims. (Cl. 305—10)

This invention relates to a traction device for wheeled vehicles having load-bearing and/or driving axles mounted in groups, usually pairs, and each carrying either single or dual wheels. This device also has application to the individual wheels either single or dual of any vehicle.

It is generally considered that wheeled vehicles are limited to operation on relatively firm ground, and that where mud and sand, and generally soft surfaces, have to be negotiated it is essential to provide an entirely different type of vehicle, namely, the conventional full track-laying or semi-track-laying vehicle in which all or a portion of the weight of the vehicle is supported on bogie wheels which run freely on an endless track which is articulated in the plane of the bogie wheels and is driven by a sprocket wheel. The result is that there should always be available two distinct vehicles, one designed for use on roads and hard surfaces and at high speeds, while the other is so constructed that, although it can operate on most types of terrain, it is not economical for use on good roads or for use at high speeds under any conditions. This, of course, means not only expense and waste, but inconvenience and delay, because a change of vehicles is seldom possible when a change of terrain requires it and, even if the transfer may be made, the shifting of the load is time-consuming.

Accordingly, various proposals have been made for extending the scope of wheeled vehicles by increasing the flotation and the adhesion of their wheels. Thus it is the practice on heavy duty vehicles to use either very large sized tires on single wheels or to use dual wheels to improve flotation, and it is common to apply so-called chains intended to increase the adhesion between the wheels and the ground. Beyond this, much experimental work has been done with traction devices, sometimes called "girdles," which include grouser elements and are wrapped around aligned pairs of wheels.

In view of the above, the object of this experimental work is to make the wheeled vehicle into a combination vehicle which may operate either at high speeds on suitable surfaces, or may, on application of a traction device, assume part or all of the functions presently performed only by full track-laying or semi-track-laying vehicles. Since any traction device which meets this object largely displaces semi-track-laying vehicles at a cost which must in any case be a very small proportion of the present cost of such vehicles, a considerable amount of time and money have been expended on developing "girdles" or wrap-around tracks, but none heretofore proposed has been thoroughly satisfactory in actual operation.

One disadvantage from which many of the known devices suffer is that, in order to obtain the necessary adhesion between the track and the tire, they are operated under considerable tension. They are therefore hard to put on and take off and, because of this and the fact that they are complicated in structure, driver maintenance is difficult, as is a ready adaptation of the vehicle for difficult terrain when it must depart from firm ground. The existing devices also suffer from the disadvantages that proper adhesion between the wheels and the track is seldom obtained. Again, some are too rigid in structure to be able to follow the wheels at full articulation, and others are so flexible that they are thrown from the wheels under certain conditions. The most serious disadvantage of some devices is that they so accelerate tire wear, due to scuffing between the tire and the track, that tires are completely ruined in a few hundred miles.

Broadly, the object of the present invention is to provide a wrap-around track in two embodiments, one for single and the other for dual wheels, which avoids the disadvantages of the known devices and gives to wheeled vehicles flotation and adhesion characteristics which have heretofore been associated only with semi- or full track-laying vehicles. Thus the wrap-around track, according to the present invention, comprises essentially a plurality of rigid track shoes which are relatively short (measured parallel to the length of the track) and are each provided with fixed guide means adapted to guide the shoe on wheel sidewalls, and a plurality of members interconnecting the shoes in spaced relation, each member extending longitudinally of the track and being pivotally connected at its ends to adjacent shoes for angular movement in any direction in relation thereto. These members, referred to for convenience as connector members, are preferably inflexible.

More specifically an object of the invention is substantially to eliminate scuffing between the track and the tire occasioned by the fact that when the resilient tire is rotating while carrying a load, the periphery of the wheel is running at two different velocities relative to the axle, the lower velocity being at the loaded portion and the higher at the unloaded portion.

A still further object of the invention is to provide a track of the type described which is smooth in operation on harder surfaces, yet has very much greater adhesion characteristics than it has heretofore been possible to obtain without sacrificing smooth operation.

A still further object of the invention is to provide a track of the type described having means for adjusting the connecting means throughout the track so that it may be put on loose and tightened in position while maintaining an approximately even spacing of track shoes.

A still further object of the invention is to provide a track of the type described which may be split between any two track shoes for ease of handling and storage.

A still further object of the invention is to provide a track of the type described which is self-clearing of mud and gives improved adhesion between soft ground and those shoes which lie in contact with the ground between aligned wheels or pairs of wheels.

Other objects and features of the invention will appear from the following description with reference to the drawings in which, Figure 1 is a side elevation of a wrap-around track according to the invention applied to an aligned pair of single wheels;

Figure 4 is a plan view of the single tire form of shoe;

Figure 5 is a side elevation of the form of shoe shown in Figure 4;

Figure 6 is an end view partially in section of two connected shoes of the form shown in Figure 4;

Figures 7 and 8 are two views of the form of bushing shown in Figure 6;

Figure 9 is a plan view of the dual tire form of shoe;

Figure 10 is a side elevation of the form of shoe shown in Figure 9;

Figure 11 is an end view partially in section of two connected shoes of the form shown in Figure 9;

Figures 12 and 13 are two views of the form of bushing shown in Figure 11;

Figure 16:
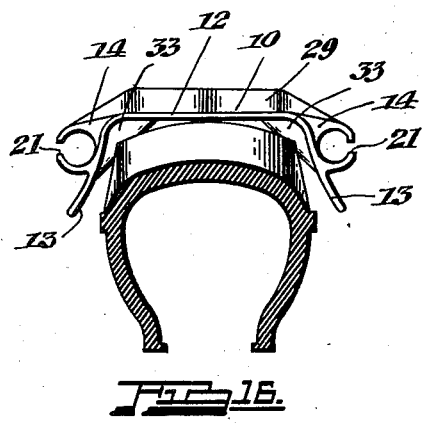
Figures 16 and 17 show respectively the relationship between tire and shoe when unloaded and when loaded, the form of shoe being that of Figure 4.
Figure 18:
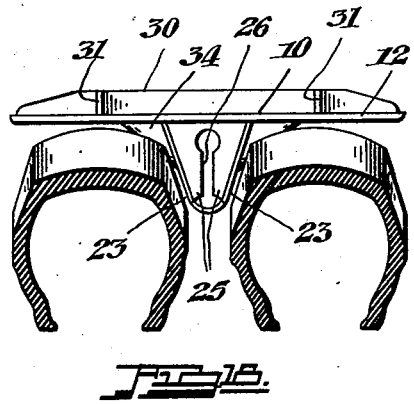
Figure 17:
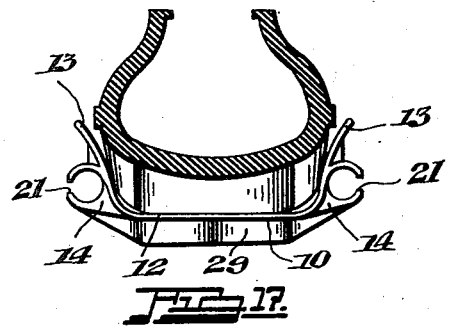
Figure 19:
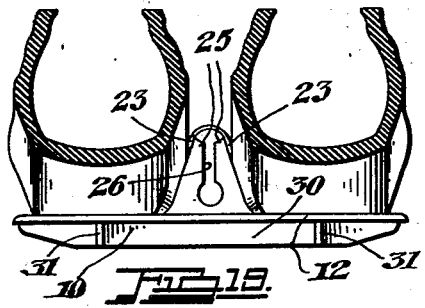

Figures 18 and 19 correspond to Figures 16 and 17, but show the dual tire form of shoe of Figure 9.

Figure 1:
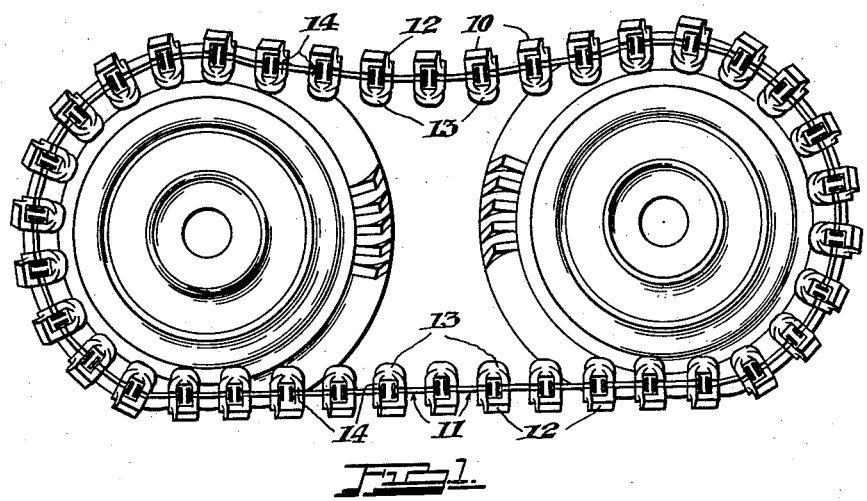
Figure 2:
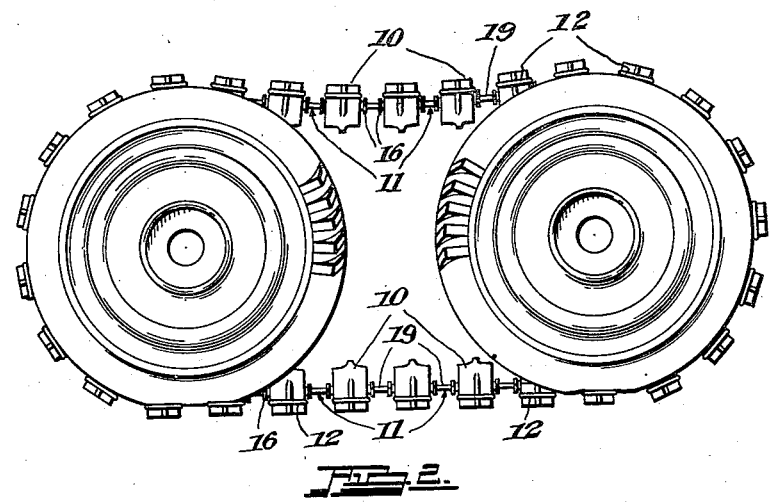
Figure 2 is a view corresponding to Figure 1 of the embodiment of the invention suitable for use with an aligned pair of dual wheels.
Figure 3:
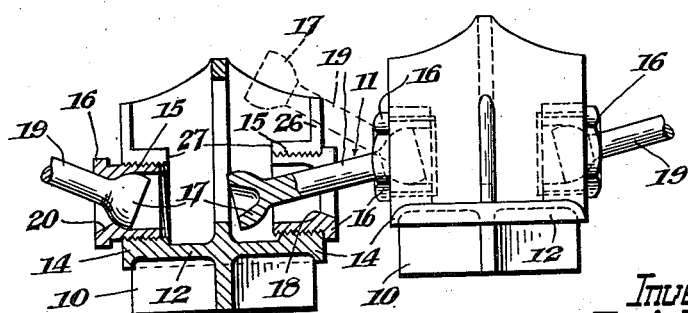
Figure 3 is an end view partially in section of two shoes of the dual tire form, illustrating the method of separating any two shoes.

As appears from Figures 1 and 2 the traction device according to the invention consists of a plurality of track shoes 10, spaced from each other and interconnected by connectors 11 which, as may be seen on referring to Figures 3, 6 and 11 are similar in shape to a dumb-bell.

The single tire form of shoe which is illustrated in Figures 4 to 6, 14, 16 and 17 is provided with a load bearing portion 12 which merges into an upstanding guide flange 13, formed at each end of the portion 12, these guide flanges 13 lying one on each side of the wheel or tire (see Figures 1, 16 and 17). A boss 14 extends outwardly from each end of each guide flange 13, that is at each corner of the shoe. Each boss 14 is bored as appears from Figure 5 and is threaded as indicated by the reference numeral 15 to receive a bushing 16 which may be that shown in Figures 7 and 8, or if desired may be that shown in Figures 12 and 13. If that shown in Figures 7 and 8 is used it is inserted in the manner shown in Figure 6 with the hexagonal head positioned between the two bosses 14 extending outwardly from a guide flange 13. If the form of bushing 16 shown in Figures 12 and 13 is used, it is fitted with the hexagonal head on the outside of each boss 14. Both forms of bushing are formed to define a bearing surface or socket for the ball-like portion 17 at each end of each dumb-bell connector member. At the base of the socket is a passage 18 for the shank 19 of a connector member 11. Beyond this passage or neck 18, the bushing is bevelled through 360 degrees as indicated at 20 in Figure 6 to permit substantial articulation in any direction.

Each boss 14 is cut away to form a slot 21 and each bushing 16 is provided with a corresponding slot 22, both being of a size to permit passage of the shank 19 of a connector member 11. For purposes of illustration the bushings in Figure 6 are shown in various positions of adjustment. In the case of the right-hand boss 14 of the right hand shoe the slot 22 is shown in line with the slot 21, and the connector member 11A may be moved to the left until the portion 17 is clear of the bushing. The connector is then withdrawn by passing the shank 19 through the aligned slots.

The dual tire form of shoe shown in Figures 9 and 10 differs from the single tire form of shoe in that the guide flanges which are numbered 23 are positioned near the centre of the shoe, and the load-bearing portions 24 extend on either side of the central guide flanges. The latter are joined by end walls or webs 25, which take the place of the bosses 14 of the single tire form of shoe, and are each bored as shown in Figure 10 and provided with a slot 26 corresponding to the slots 21. They are also each provided with an inwardly extending sleeve 27 which may be formed as an integral part of the portion 24 or may be welded thereto. Each sleeve 27 is slotted to agreed with the slots 26, and is internally threaded at 28 to receive a bushing 16 which is preferably formed as shown in Figures 12 and 13.

Because each connector is separably connected to a shoe at each end, the track whether of the form shown in Figure 1 or that shown in Figure 2 may be separated at any point, and because each point of connection of a connector member 11 to a shoe 10 is adjustable by virtue of the bushing 16, the length and thus the tension of the track may be readily adjusted while maintaining the distance between shoes substantially uniform through the length of the track. A great advantage flowing from this construction is the fact that the track may be put on the aligned wheels in a relatively loose condition without fear of disturbing the uniformity of spacing on tightening up the track.

As indicated above it is a most serious disadvantage of known traction devices that scuffing between the tire and the track rapidly wears out the tire. This scuffing is occasioned by the fact that when the resilient tire is rotating while carrying a load, the periphery of the wheel is running at two different velocities relative to the axle, the lower velocity being at the loaded portion and the higher at the unloaded portion. I have discovered that in order to cause a track consisting of non-extensible components to run on such a wheel without relative motion between the contact surfaces of the shoes and the periphery of the resilient tire, it is necessary to locate the means for connecting the track shoes closer to the axis of rotation than the load-carrying surface of the shoes by an amount which is approximately equal to the deflection of the resilient tire in the loaded condition, that is, the difference in radius of the loaded and unloaded portions of the tire.

The means for connecting the track shoes, that is the connector members 11 and the bushings 16 are spaced accordingly in both forms of the invention. This spacing and the tire deflection are illustrated in Figures 1, 2 and 16-19.

As appears most clearly from Figures 6 and 11, the distance between shoe centres is much greater than the distance between the articulation points, that is, the socket centres in the assembled track. Preferably, as shown, the connection sockets are approximately evenly spaced throughout the device, the distance between shoe centres being approximately double the distance from one socket to the next.

Experiments have shown that in order to obtain the maximum traction characteristics in soft ground the shoes should be spaced apart a distance which is much too great to permit smooth operation of the track on harder surfaces. On the other hand, in order to obtain a smooth-running track and to reduce the tendency for the track to come off, the distance between articulation points should be reduced as far as possible. By spacing the socket connections as indicated, I provide an arrangement which has the advantage of a short distance between articulation points and the advantage of an increased distance between shoe centres. In order to obtain this spacing the single tire form of shoe is provided with four bushings and the dual tire form of shoe is provided with two bushings so that each connector member bridges only two shoes and is connected at each end to a shoe. In the single tire form of track any pair of adjacent shoes is connected by two connector members, one lying at each side of the wheel or tire (see Figs. 16 and 17). In the dual tire form of track each pair of adjacent shoes is connected by only one connector member which lies between the dual wheels or tires (see Figs. 18 and 19).

Figure 14:
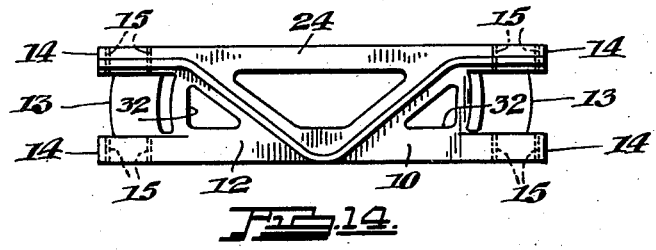
Figure 14 is a bottom view of the single tire form of shoe of Figure 4.
Figure 15:
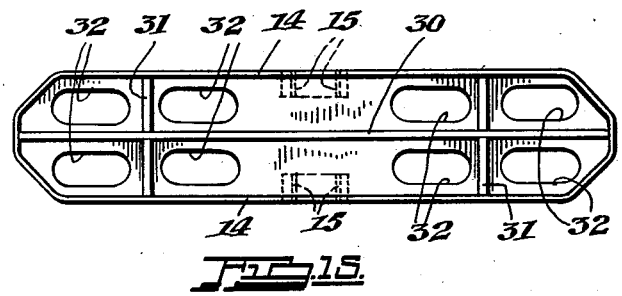
Figure 15 is a bottom view of the dual tire form of shoe of Figure 9.

The single tire form of shoe is provided on the bottom with a chevron shaped grouser 29, as best shown in Figure 14, and the dual tire form of shoe is provided with a straight grouser 30 running from side to side of the shoe (the end of a shoe being that portion which is adjacent to another shoe) and two short grousers 31 running at right angles to the long grouser 30 and parallel to the length of the assembled track.

As appears from Figures 4, 9, 14 and 15 the load-bearing portion of each shoe is an open mesh structure, the holes 32 being provided for passage of mud and the like. It is to be noted that mud is pushed down through these holes 32 in the case of a loaded shoe and is passed up through these holes and provides increased traction in the case of those shoes which engage the ground between the aligned wheels on which a track is fitted. I have discovered that such does not appreciably increase the tendency of the shoe to penetrate into soft ground, but it does prevent mud from building up between the shoe and the tire and from thus reducing adhesion between the two.

Both forms of shoe are provided with ribs extending upwardly from the load-bearing portion of the shoe and outwardly from the guide flanges. In the single tire form of shoe the upstanding ribs 33 are in line with the two bosses 14, at one end of the shoe. In the dual tire form of shoe a central rib 34 is provided for each load-bearing portion 24. These ribs engage the tread pattern of the resilient pneumatic tire at the corners thereof and increase adhesion between the tire and the shoe.

The method of separating any two shoes is illustrated in Figure 3 with reference to the dual tire form of shoe. The bushing which is at that end of a connector member to be disconnected is rotated to bring its slot 22 into alignment with the slot 26, that is the slot 22 is brought to the top. Then the two shoes are moved towards each other and, as indicated in Figure 3, the shoe from which the connector member is to be released is dropped down. Bringing the shoes together, moves the portion 17 at the left hand end of the connector to the left so as to clear the bushing socket and when the shoe is dropped down, the shank 19 of the connector member passes into the bushing slot 22. The connector member is then raised clear of the bushing as indicated in dotted lines and the connection between the two shoes is completely broken.

What I claim is:

1. A traction device for attachment to resilient-tire-carrying vehicle wheels, comprising a plurality of rigid, relatively short track shoes, fixed guide means in connection with each shoe adapted to guide the shoe on tire sidewalls, and a plurality of inflexible connector members interconnecting the shoes in spaced relation, each such member extending longitudinally of the traction device, and being pivotally connected at each end to a shoe for angular movement in any direction in relation thereto, and the axis of each connector member being located closer to the axis of rotation of a wheel than the loading-carrying-tire-contacting surface of each shoe by an amount approximately equal to the tire deflection of the wheel.

2. A traction device for attachment to resilient-tire-carrying vehicle wheels, comprising a plurality of rigid, relatively short track shoes, fixed guide means in connection with each shoe adapted to guide the shoe on tire side walls, a plurality of inflexible connector members extending longitudinally of the device and interconnecting the shoes in spaced relation, each such member having a shank and an enlarged portion at each end, and a pivotal connection between each such enlarged portion and the adjacent shoe comprising a socket adapted to receive such enlarged portion and support the same for angular movement of the connector member in any direction in relation to the shoe, the axis of each connector member being located closer to the axis of rotation of a wheel than the load-carrying-tire-contacting surface of each shoe by an amount approximately equal to the tire deflection of the wheel.

3. A traction device for attachment to resilient-tire-carrying vehicle wheels, comprising a plurality of rigid, relatively short track shoes, fixed guide means in connection with each shoe adapted to guide the shoe on tire side walls, a plurality of inflexible connector members extending longitudinally of the device and interconnecting the shoes in spaced relation, each such member having a shank and an enlarged portion at each end, a pivotal connection between each such enlarged portion and the adjacent shoe comprising a socket adapted to receive such enlarged portion and support the same for angular movement of the connector member in any direction in relation to the shoe and means for adjusting such pivotal connection to vary the space between any two shoes, the axis of each connector member being located closer to the axis of rotation of the wheel than the load-carrying-tire-contacting surface of each shoe by an amount approximately equal to the tire deflection of the wheel.

4. A device as defined in claim 3 in which said adjusting means comprises a bushing adjustable longitudinally of the device, said socket being formed in said bushing.

5. A device as defined in claim 4 in which each bushing is threaded into a shoe, each shoe is provided with a slot leading to a sidewall of a bushing and each bushing is provided with a slot adapted to be aligned with the shoe slot on rotation of the bushing to pass the shank of a connector member.

6. A traction device for attachment to resilient-tire-carrying vehicle wheels, comprising a plurality of rigid, relatively short track shoes having the load bearing portion of each shoe perforated to define an open mesh structure, fixed guide means in connection with each shoe adapted to guide the shoe on tire sidewalls, and a plurality of inflexible connector members interconnecting the shoes in spaced relation, each such member extending longitudinally of the traction device, and being pivotally connected at each end to a shoe for angular movement in any direction in relation thereto and the axis of each connector member is located closer to the axis of rotation of a wheel than the load-carrying-tire-contacting surface of each shoe by an amount approximately equal to the tire deflection of the wheel.

7. An articulated wrap-around track for aligned resilient tire-carrying vehicle wheels of the single tire type, comprising a plurality of rigid relatively short track shoes, and two inflexible connector members interconnecting each pair of adjacent shoes throughout the track in spaced relation, each shoe comprising a load-carrying portion, two guide flanges projecting toward the wheel centre, one on each side of the tire, and adapted to guide the shoe on the tire sidewalls, a boss projecting transversely of the track at each corner of the shoe, and a bushing threaded into each boss for adjustment longitudinally of the track, and each connector member being pivotally connected at each end to a bushing of adjacent shoes, with the axis of each connector member located closer to the axis of rotation of the wheel than the load-carrying-tire-contacting surface of each shoe by an amount approximately equal to the tire deflection of the wheel.

8. An articulated track as defined in claim 7, in which each connector member is in the shape of a dumb-bell with a shank and an enlarged portion at each end having a part-spherical shoulder, and each bushing is formed with a socket adapted to receive the enlarged portion of a connector member and with a bore adapted to pass the shank thereof.

9. An articulated track as defined in claim 8 in which each boss is provided with a slot adapted to pass the shank of a connector member and each bushing is provided with a corresponding slot adapted on rotation of the bushing to be aligned with the boss slot.

10. An articulated track for attachment to aligned resilient tire-carrying vehicle wheels of the dual tire type, comprising a plurality of rigid relatively short track shoes, an inflexible connector member interconnecting each pair of adjacent shoes throughout the track in spaced relation, each shoe comprising two load-carrying portions, two guide flanges separating said load-carrying portions and projecting inwardly toward the wheel centre, said guide flanges fitting between dual tires to guide the shoe on adjacent sidewalls thereof, a web joining said guide flanges at each end of the shoe, and a bushing threaded into each web for adjustment longitudinally of the track, and each connector member being pivotally connected at each end to a bushing of adjacent shoes of the track.

11. An articulated track as defined in claim 10, in which each connector member is in the shape of a dumb-bell with a shank and an enlarged portion at each end having a part-spherical shoulder, and each bushing is formed with a socket adapted to receive the enlarged portion of a connector member and with a bore adapted to pass the shank thereof.

12. An articulated track as defined in claim 11, in which each web is provided with a slot adapted to pass the shank of a connector member and each bushing is provided with a corresponding slot adapted on rotation of the bushing to be aligned with the web slot.

13. An articulated track as defined in claim 10, in which the axis of each connector member is located closer to the axis of rotation of a wheel than the load-carrying-tire-contacting surface of the shoe by an amount which is approximately equal to the tire deflection of the wheel.

BASIL DION IRVIN.

REFERENCES CITED

The following references are of record in the file of this patent:

UNITED STATES PATENTS

| Number | Name | Date |
|---|---|---|
| 443,769 | Hurford | Dec. 30, 1890 |
| 2,066,852 | Plummer | Jan. 5, 1937 |

FOREIGN PATENTS

| Number | Country | Date |
|---|---|---|
| 325,135 | Great Britain | Feb. 13, 1930 |
| 450,166 | Great Britain | July 13, 1936 |
| 710,824 | France | June 16, 1931 |